G. MATTHEWS.
PEAT WORKING MACHINE.
APPLICATION FILED OCT. 28, 1907.
932,041.
Patented Aug. 24, 1909.
5 SHEETS—SHEET 1.
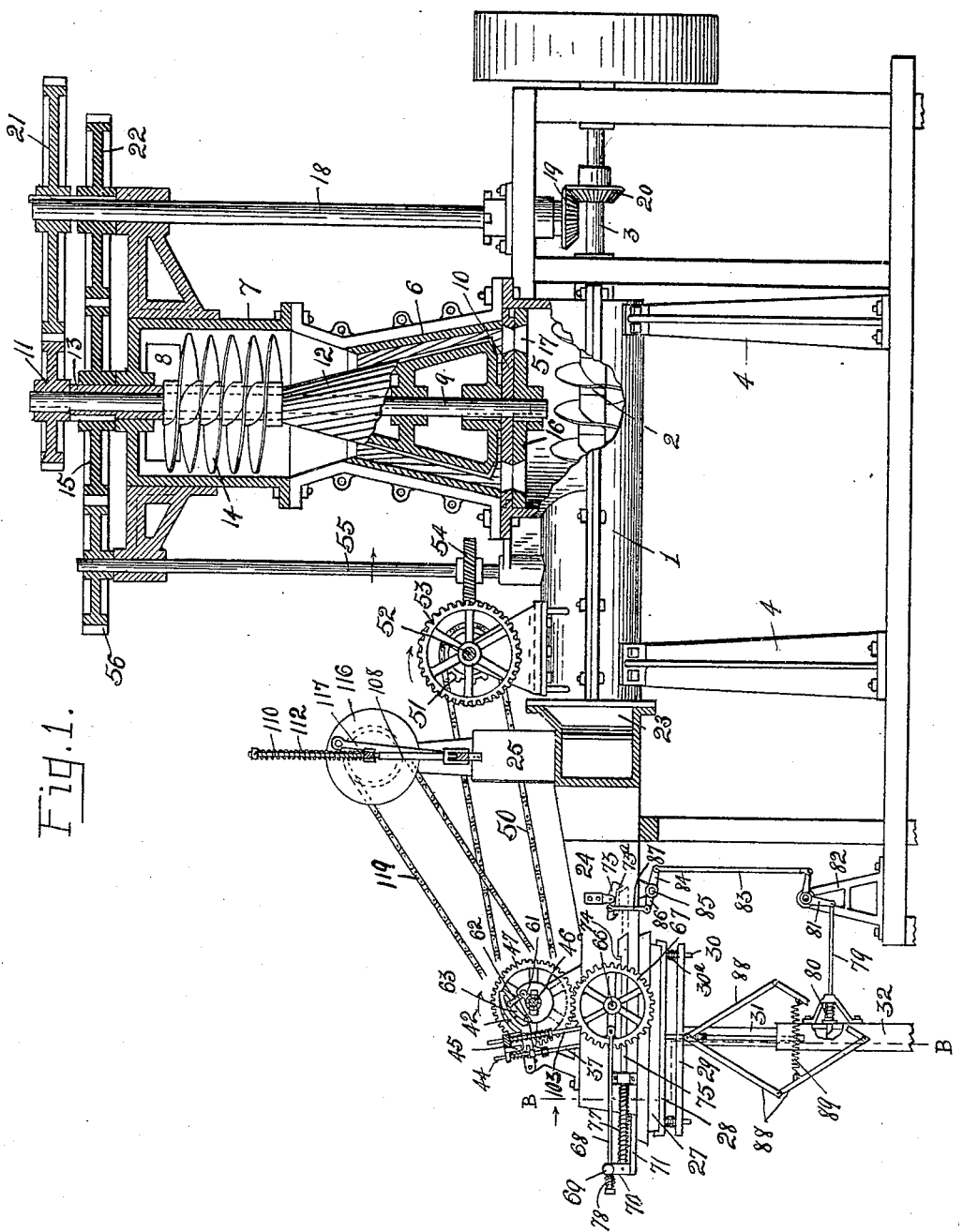
WITNESSES:
D. C. Walter
Hazel B. Hiett
INVENTOR.
George Matthews
By Owen & Owen
His attys.

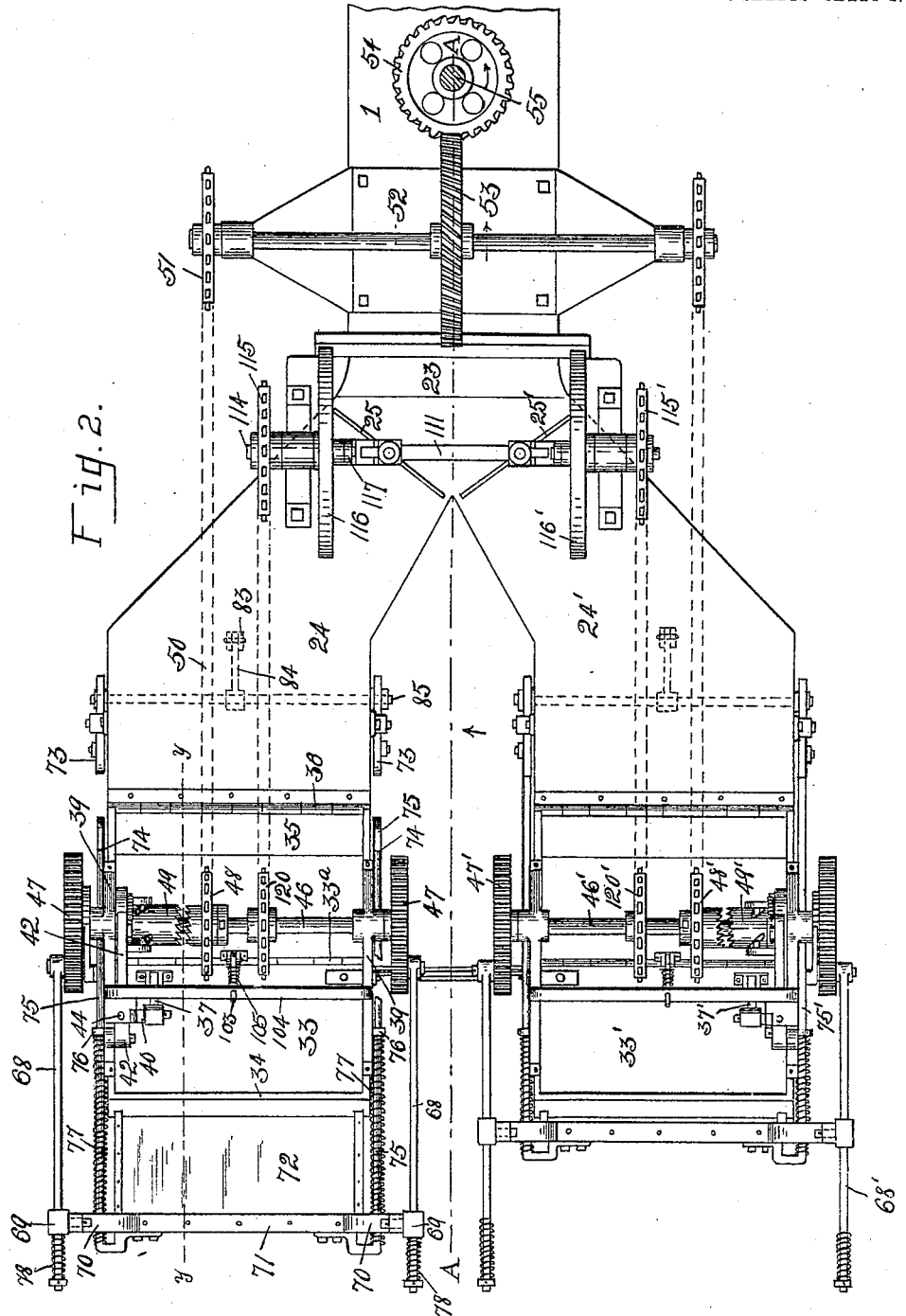

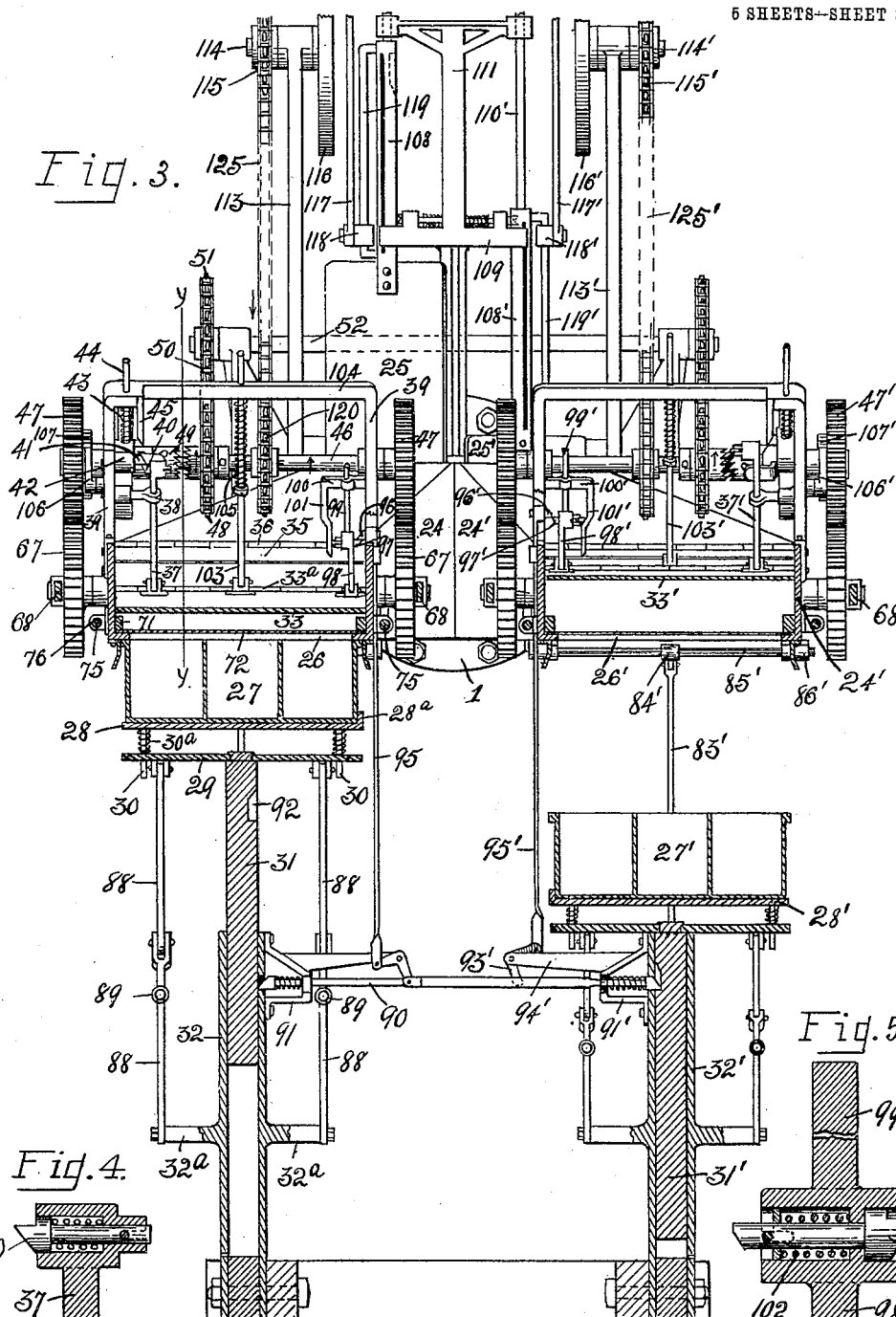
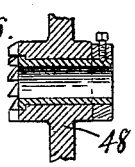

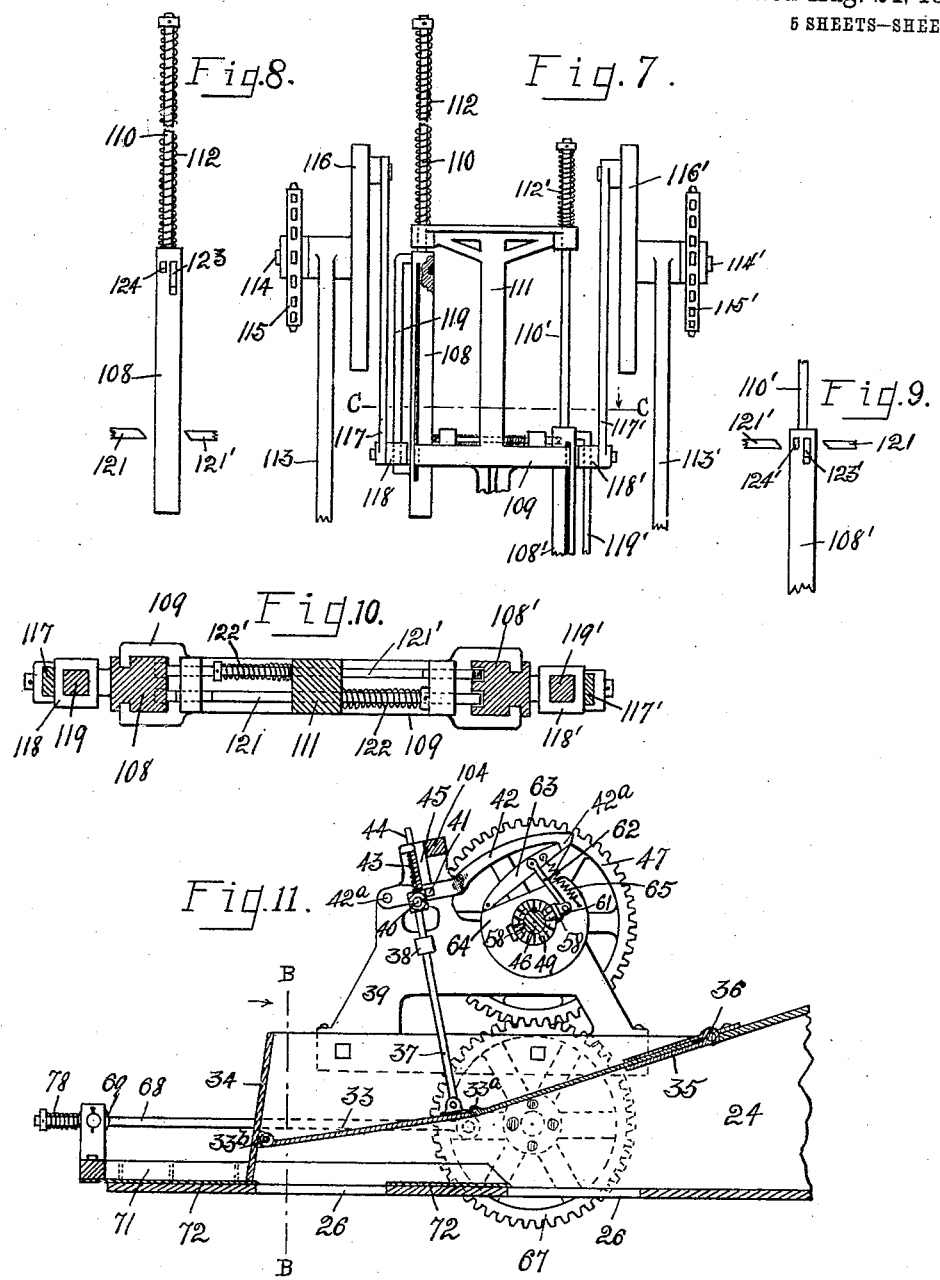

G. MATTHEWS.
PEAT WORKING MACHINE.
APPLICATION FILED OCT. 28, 1907.

932,041.

Patented Aug. 24, 1909.
5 SHEETS—SHEET 5.

WITNESSES.
D. C. Walter
Hazel B. Hiett

INVENTOR.
George Matthews,
By Crone & Owen
His attys.

UNITED STATES PATENT OFFICE.

GEORGE MATTHEWS, OF RIGA, MICHIGAN.

PEAT-WORKING MACHINE.

932,041. Specification of Letters Patent. Patented Aug. 24, 1909.

Application filed October 28, 1907. Serial No. 399,606.

*To all whom it may concern:*

Be it known that I, GEORGE MATTHEWS, a citizen of the United States, and a resident of Riga, in the county of Lenawee and State of Michigan, have invented a certain new and useful Peat-Working Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to machines of the class designed particularly for the reduction of peat or other like matter to a semi-liquid state after which such matter is molded into cakes, blocks or the like preparatory to drying, and has particular reference to improvements on the machine covered by United States Letters Patent No. 852,609 and granted to me May 7, 1907.

The primary object of my invention is the provision of improved mechanism for automatically regulating and controlling the flow of the substance worked and operating a set of mold carrying parts to move first one and then another into position for a mold pan carried thereby to be filled and then removed, whereby a more rapid, efficient and commercially valuable machine is provided.

Further objects of my invention as well as the operation, construction and arrangement of the parts thereof will be obvious by reference to the following description and the accompanying drawings, in which,—

Figure 12:
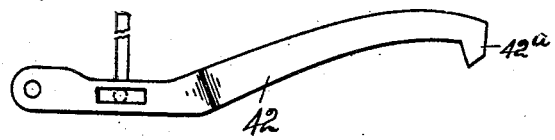
Figure 13:
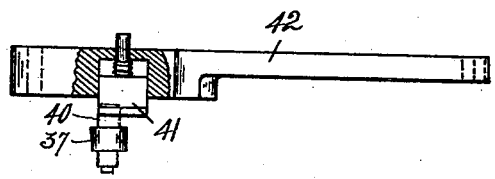
Figure 14:
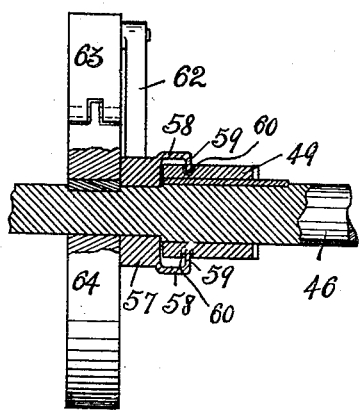

Figure 1 is a side elevation of the machine embodying my invention, with the grinding and feed parts in partial section and the delivery parts in section on the dotted line A A in Fig. 2 with the upper portion thereof in section along a portion of the line y y in Fig. 3. Fig. 2 is a top plan view of the delivery portion of the machine. Fig. 3 is a vertical transverse section taken on the dotted line B B in Fig. 1. Figs. 4 and 5 are enlarged sectional details of different of the yieldingly mounted tripping catches which are actuated by a movement of the valve. Fig. 6 is an enlarged sectional detail of the loose clutch member. Fig. 7 is an elevation of the gate valve operating mechanism. Figs. 8 and 9 are diagrammatical views of parts thereof. Fig. 10 is a cross-section on the dotted line C C in Fig. 7. Fig. 11 is an enlarged vertical section on the dotted lines y y in Figs. 2 and 3. Figs. 12 and 13 are enlarged details of the clutch-tripping dog, and Fig. 14 is an enlarged detail, partly in section, of the feathered clutch member and its actuating parts.

Referring to the drawings, 1 designates a horizontal cylindrical trough, which incloses a feed-worm 2 carried by the main drive-shaft 3 and is supported by legs 4, or in any other suitable manner. Surmounting one end of the trough 1 and communicating therewith, as at 5, is a conical casing 6, which is provided at its upper contracted end with a flaring mouth which supports the feed-hopper 7 having the side feed opening 8 at its upper end. Standing vertically within said casing and hopper is a shaft 9, which has its lower end centrally journaled within the fixed cutting-disk 10 at the bottom of the casing 6 and its upper end projected through the top of the hopper 7 and carrying a gear 11 without the hopper. Mounted on this shaft immediately above the cutting-disk 10 within the conical portion of the casing 6 is a conical grinding-drum 12, which coöperates with the casing to reduce the peat or other substance to a fine pulpy mass of semi-liquid state. Mounted on the shaft 9 intermediate the gear 11 and drum 12 is a sleeve 13, which carries a feed-worm 14 within the hopper and gear 15 without the hopper, which gear is of greater diameter than the gear 11, as shown in Fig. 1. The shaft 9 at its lower end, which is projected below the cutting-disk 10, carries a rotary cutting-disk 16, which rotates in shearing engagement with the disk 10 and is provided with a series of openings 17, which register with similar openings in the disk 10.

Suitably journaled at the side of the casing 6 and hopper 7 is a vertical shaft 18, which carries at its lower end a bevel gear 19 meshing with a bevel gear 20 on the drive-shaft 3, and at its upper end a large gear 21 and small gear 22, meshing, respectively, with the gears 11 and 15, thus causing a relatively faster rotation to be communicated to the shaft 9 than to the sleeve 13.

The trough 1 at its forward end opens into a conduit 23 having the lateral branches 24, 24' leading therefrom and extending forwardly of the machine and in parallel relation for a portion of their lengths as shown in Fig. 2. Mounted at the points of connection of each branch 24, 24' with its trunk 23 are the vertically movable gate-valves 25, 25', respectively, which valves are automatically operated to alternately open and close their respective openings at predetermined stages in the operation of the machine as hereinafter fully described, thus permitting the ground peat to be discharged first through one and then the other of the branches 24, 24'.

As the operating mechanisms associated with both branches 24, 24' of the conduit are exact duplicates, a detailed description of but one will be necessary, and it will be understood in such description that the like parts of the two mechanisms will be designated by the same reference numerals, except that those of the branch 24' will have the prime mark added.

As the peat enters and passes through one of the conduit branches, the right, for instance, looking toward the front end of the machine, it is discharged through one or more openings 26 in the bottom of the conduit at the forward end thereof into a mold-box or pan 27, which is carried by a vertically movable subjacent table 28 and held in contact with the conduit bottom by such table during the filling operation. The number of openings 26 depends upon the number of compartments into which the mold-boxes 27 may be divided longitudinally thereof, two openings being shown in the present case. The table 28 is formed on three sides thereof with upwardly projecting flanges 28$^a$ to serve as stops to center a mold-box thereon, and is yieldingly supported by a subjacent member 29, due to pins 30 projecting from the table 28 through said member and being encircled with coiled compression-springs 30$^a$, as shown in Figs. 1 and 3. The member 29 is centrally fixed to the upper end of a post 31, which is mounted for relative vertical movement within a tubular or hollow standard 32 rising from the floor or other support.

Mounted above the discharge openings 26 in slightly spaced relation, as shown in Fig. 11, is a valve-member 33, which is formed of two parts hinged together, as at 33$^a$. The forward one of these parts has its forward edge hinged, as at 33$^b$, to the front end piece 34 of the conduit while the rear edge of the other part is mounted for free sliding movement in the slotted guide-member 35, which is hinged, as at 36, to the forward end of the top-piece of the conduit. It is thus apparent that the valve-member 33 forms a continuation of the top-piece of the conduit, and that a crowding or backing up of the peat thereunder when a mold-box becomes filled will cause a raising of such member.

Pivotally rising from the outer side portion of the valve 33 is a rod 37, which operates through a guide 38 projecting inwardly from the outer frame part 39, one of which rises from each side of the conduit at the side of the valve. The upper end of the rod 37 is provided with a chambered head, best shown in Fig. 4, in which a normally-extended spring-pressed catch 40 is mounted. As the rod 37 is elevated by a raising of the valve 33 the nose of the catch 40 engages the nose of a coöperating catch 41, which is yieldingly carried in normally extended position by the pawl or pivoted arm 42, as best shown in Fig. 13, thus effecting a raising of the pawl on its pivot against the tension of the coiled spring 43, which is mounted on the pin 44 projecting from the pawl, as shown. The pawl 42 is pivoted, as at 42$^a$, to the frame part 39. The catch 41 is made wider than the catch 40, as shown in Figs. 11 and 13, to adapt the portion of its beveled face at the side of the catch 40 to come in contact with the beveled end of a pendent finger 45 on the frame part 39 at a predetermined point in the raising movement of the pawl 42, thus causing the catch 41 to be forced out of engagement with the catch 40 and permitting the pawl 42 to drop.

Journaled in the frame parts 39 at the rear of the rod 37 and transversely of the conduit is a shaft 46, the ends of which project beyond the bearings and have gears 47, 47 keyed thereto. Mounted on the shaft 46 intermediate its bearings is a loose sprocket-wheel 48, the hub of which is notched to form a clutch member and is intended to communicate rotation to the shaft 46 when a feathered clutch-sleeve 49 on the shaft is moved into engagement therewith. The sprocket-wheel 48 is driven by a chain 50, which connects with a sprocket-wheel 51 on one end of a shaft 52. This shaft is mounted in suitable bearings over the forward end of the worm trough 1, transversely thereof, and carries a spiral-gear 53, which meshes with and is driven by a spiral-gear 54 on the vertical shaft 55. This latter shaft is mounted in suitable bearings at the forward side of the drum-casing 6 and hopper 7 and is driven by a gear 56 on its upper end meshing with the gear 15 on the sleeve 13.

The clutch-sleeve 49 is thrown into engagement with its clutch-member by the relative rotation on the shaft 46 of a collar 57, as such collar is provided with opposed arms 58 having pins 59 projecting inwardly therefrom and into registering diagonally-disposed slots 60 in said sleeve, as best shown in Fig. 14. The collar 57 is provided at one side thereof with a radially-projecting lug 61 (see Fig. 11) to which is pivoted one end of a short rod or link 62, the other end thereof being pivoted to a finger 63. This finger is pivoted to one side of a member 64, keyed to the shaft 46, and is adapted to have radial oscillatory movements relative to the shaft. A coiled contraction-spring 65 has its ends secured to said finger and member and acts to normally retain the finger at its limit of inward movement, at which position the clutch sleeve stands in engagement with its member due to the consequent position of the collar 57. As the finger 63 reaches a predetermined point in its revolution with the shaft 46 its free end is intended to be reëngaged by the hooked end 42ᵃ of the pawl 42 and raised or moved outwardly against the action of the spring 65 to the position shown in Fig. 11, thus causing the collar 57 to be rotated to effect a releasing movement of the clutch-sleeve 49 and forming a positive stop for the shaft 46, as the member 64, which is keyed thereto, cannot continue its rotation until the finger 63 has been released from engagement with the pawl 42.

It will be understood from the foregoing that a raising of the gate valve 33 by the action of the peat thereunder will effect an automatic release of the pawl 42 from engagement with the finger 63, due to the rod 37 rising and lifting the pawl, and effect a consequent throwing into engagement of the clutch and revolution of the shaft 46. The shaft is permitted to make but a single revolution, due to the pawl 42, which is immediately returned, by the action of the spring 43, to its normal lowered position, reëngaging the finger 63 at the completion of such revolution and lifting it to disengage the clutch from the drive sprocket 48 and stop the shaft 46.

Mounted on stub-shafts 66, 66, one of which projects from each side of the discharge conduit are gears 67, 67, which mesh with and are the same size as, the associated gears 47, 47 so that single revolutions are imparted thereto at each revolution of the latter gears. Connected to a wrist-pin on each gear 67 is the rear end of a pitman-rod 68, the other end of which projects forwardly through a guide-box 69, which is pivotally carried by an arm 70 projecting upwardly from the forward portion of a horizontally movable cutter-frame 71 at the contiguous side thereof, as shown in Figs. 1, 2 and 11. The cutter-frame 71, which is U-shape in construction or devoid of a cross-piece at the rear end thereof, has its side-pieces connected by a number of cutter-plates 72 corresponding to the number of discharge-openings 26 in the conduit, said cutters being intended, when moved rearwardly, to sever the feed column and completely close the discharge openings. When the cutter-frame is at its limit of rearward movement it is retained in such position by pawls 73 on the outer sides of the discharge conduit (see Figs. 1 and 2) engaging notches 74 in the rear ends of rods 75, which rods project rearwardly from the forward end portion of the cutter-frame through guides 76 at the sides of the conduit. The ends of the rods 75 are beveled as shown to adapt them to coöperate with bevel-faced lugs 73ᵃ on the rear ends of the pawls to cause a positive lowering of the forward ends of the pawls when the beveled surfaces come in contact. When the pawls have been released from engagement with the rods 75, as hereinafter described, the cutter-frame 71 is actuated to return to its extreme forward position to uncover the discharge openings 26 by the action of coiled compression-springs 77 which are carried by the rods 75 intermediate the forward ends of such rods and the guides 76. The stopping of the cutter-frame on its outward movement is cushioned by compression-springs 78, which are carried by the pitman-rods 68 between the headed forward ends thereof and the guide-boxes 66 as shown.

Referring to Fig. 1, 79 designates a horizontal catch-rod which has one end projecting through an opening in the side of the standard 32 in position to project under the post 31 when elevated and support such post and its table 28 in elevated position with an associated mold-box 27 in contact with the bottom of the conduit. This catch is thrown inwardly by the action of a compression-spring 80 thereon and has its outer end attached to one arm of a bell-crank lever 81 having a horizontal axis and being supported by a standard 82. The other end of this lever connects with the lower end of a rod 83, the upper end of which is attached to a crank-arm 84 carried by a shaft 85, which is journaled beneath the conduit transversely thereof. A crank-arm 86 at each end of this shaft is connected with the forward end portion of the pawl 73 at its side of the conduit by a rod or link 87, thus causing a releasing or withdrawal movement of the catch-rod 79 from engagement with the post 31 to be effected by the engaging movements of the pawls 73 with the rods 75, which movement is rendered positive by the contact of the rod end with the beveled lugs 73ᵃ of the pawls.

Projecting from opposite sides of the standard 32 are bosses 32ᵃ from each of which rises a double set of toggle-links 88, which connect with the under side of the table member 29. Each double set of toggle-links have opposed or outward folding movements and are normally retained in a vertically contracted state to elevate the table due to the action thereon of a coiled contraction-spring 89, as shown in Figs. 1 and 3. The springs 89 are of sufficient tension to raise the table with an empty mold-box 27 thereon, but are intended to yield under the weight of a filled mold-box, so that on a release of the catch-rod 79 from engagement with the post 31 the table 28 will drop to the position shown at the right of Fig. 3, in which position the filled mold-box is removed and an empty box substituted therefor.

As the table 28 reaches its limit of downward movement a spring-pressed catch-rod 90, which projects through an opening in the side of the standard 32 and is carried by a bracket 91, moves into engagement with a notch 92 in the post 31, thus locking the post and table against an upward movement, which would otherwise be occasioned by the coöperating action of the toggles 88 and springs 89, when the table is relieved of the weight of the filled mold-box. The outer end of the catch-rod 90 extends toward the standard 32' associated with the other conduit of the machine and is attached to one arm of a vertically-disposed bell-crank-lever 93', which is carried by the arm 94' projecting from the bracket 91' of the standard 32'. To the horizontal arm of the lever 93' is attached the lower end of a rod 95' which extends upwardly through suitable guides at the inner side portion of the conduit 24' and has its upper end terminating above the conduit and provided with a head in which is mounted a normally extended spring-pressed catch 96', as shown in Fig. 3. This catch is intended to be engaged by a catch 97' carried by the upper headed end of a rod or standard 98', which pivotally rises from the valve 33' adjacent to the inner side of the conduit, so that an upward movement of the valve will effect a raising of the rod 95', through the engagement with its catch 96' of the coöperating catch 97'. As the rod 95' is raised the bell-crank lever 93' is rocked in the proper direction to effect a withdrawal of the catch-rod 90 from engagement with the notch 92 in the table post 31, thus permitting the table 28 with its empty mold-box to ascend to filling position under the action of the toggles 88 and springs 89 when the filling of a mold-box in contact with the other conduit has been completed. An extension 99' is provided on the headed end of the rod or standard 98' and operates through an aperture in a guide-arm 100' projecting from the inner frame part 39' of the conduit. This arm is provided with a pendent finger 101' having an inner cam face, as shown, with which the stem end of the catch 97' coacts as the latter is raised and lowered. The cam face of the finger 101' is fashioned to permit the catch 97', actuated by its coiled-spring, as shown at 102 in Fig. 5, to recede from engagement with the catch 96', at a predetermined point in the upward movement of the former, so that the catch 97' continues the remainder of its upward movement alone. As the valve 33' drops to its normal position, due to a release of the peat substance thereunder, the catch 97' is positively moved against the tension of its spring into position to engage the catch 96' due to the action of the cam-finger 101' thereon and causes a depression of the catch 96' to permit it to pass below the same.

103 designates a push-rod, which pivotally rises from the valve 33, as shown in Figs. 2 and 3, and has its upper end operating through a guide-opening in a cross-piece 104, which connects the upper ends of the frame-parts 39. This rod carries a coiled compression-spring 105, which operates against a collar or shoulder on the rod and the under side of the cross-piece 104 to normally retain the valve in lowered position. In Figs. 2 and 3 is also shown a dog 106 which coacts with a ratchet-wheel 107 on the shaft 46 to prevent a backward turning of the shaft.

The mechanism employed for operating the gate-valves 25 and 25' consists in providing the gates with upwardly extending arms 108 and 108', respectively, which arms have vertically guided movements in the opposite ends of a cross-piece 109 carried by a standard, as shown in Figs. 3, 7 and 10, which standard rises from the top of the conduit 23. Rising from the upper ends of the arms 108, 108' are rods 110, 110', respectively, which operate through guide-boxes in the ends of the arms of a T frame 111, which rises from the cross-piece 109, as shown. Coiled compression-springs 112, 112' are carried by the rods 110, 110' and operate against stops at the upper ends of the rods and their guide-boxes to normally retain a rod and its attached valve in elevated position. Journaled in standards 113 and 113' which rise from the conduit 23 at the outer sides of the frame parts 109 and 111 are short shafts 114 and 114', respectively, each of which carries a sprocket-wheel 115, 115' at its outer end and a crank-disk or arm 116, 116' at its inner end. Each crank-disk or arm 116, 116' has a connecting-rod 117, 117' projecting downwardly from its wrist-pin and pivotally carrying a guide-box 118, 118' at its lower end. This guide-box slides on a vertical guide-rod 119, 119', which is carried at the outer side of the associated gate-arm 108, 108', as shown. A chain 125 connects a sprocket-wheel 120 on the shaft 46 with the sprocket-wheel 115 on the shaft 114 so that a single revolution of the shaft 46 will impart a like movement to the crank-disk 116, the position of whose wrist-pin is such as to always stop at its top center of movement. On a revolution of the crank-disk the guide-box 118 engages the angled lower end of the guide-rod 119 and forces its gate down against the tension of the spring 112 to close the opening from the conduit 23 to the branch 24.

Mounted on the upper side of the cross-piece 109 are two catch-rods 121 and 121', which have their like ends oppositely beveled, as shown. The catch-rod 121', under the action of a compression-spring 122', is intended to have one end move into an elongated notch 123 in the arm 108 as it nears the limit of its downward movement and its opposite end move out of locking engagement with a notch 124' in the arm 108' to permit said latter arm, under the action of the spring 112, to ascend and open the gate 25' to the conduit 24'. As the arm 108' ascends the end of the catch-rod 121 contiguous to the arm 108' is forced out of the elongated slot 123' therein, against the tension of the compression-spring 122, and its opposite end is moved into engagement with the notch 124 in the arm 108 to lock the arm and its valve in closed position. When the valve 25' is again lowered it is locked in such position by the catch-rod 121', and the valve 25 is permitted to rise due to the release of its arm from the catch-rod 121, thus causing an alternate opening and closing of the valves 25 and 25' to cause the peat to enter one and then the other of the branch conduits 24, 24'.

The operation of the machine is as follows:—The position of the parts being as shown in the drawings, the peat enters the branch conduit 24 and is discharged through the openings 26 into the mold-box 27, which is held in contact with the under side of the conduit by the table 28. When the box has been filled the peat, which no longer finds an exit from the trough, is forced upwardly against the under side of the valve 33 and effects a raising thereof. As the valve rises the catch 40, carried by the rod 37, engages the coöperating catch 41 on the pawl 42 and effects a raising of the pawl out of engagement with the clutch controlling finger 63, thus permitting the finger, under the influence of the contraction spring 65, to have an inward oscillatory movement. This movement of the finger causes the collar 57 to have a rotary movement relative to the shaft 46 and to move the clutch-sleeve 49 into engagement with its clutch-member on the sprocket-wheel 48 due to the pins 59 carried by the collar 57 working in the diagonal slots 60 in the clutch-sleeve, thus causing rotation to be communicated to the shaft from the sprocket-wheel. When the pawl 42 has been raised sufficiently to release the finger 63, the catch 41 has contact with the pendent finger 45 of the frame part 39 and is depressed thereby to cause its release from the catch 40. On a disengagement of the catches 40, 41, the pawl 42, under the influence of the spring 43, returns to its normal position and again engages the finger 63 at the completion of a single revolution thereof, thus lifting said finger against the tension of its spring and effecting a disengagement of the clutch and a positive stopping of the shaft. As the shaft 46 revolves a single revolution is also communicated to the gears 67, 67, and the pitman-rods 68 thereby caused to make a rearward stroke to draw the cutter-plates 72 across the discharge-openings 26 to close the same and sever the peat column at the top of the mold-box. As the cutter-frame reaches its limit of rearward movement the beveled ends of the rods 75, carried by said frame, strike the beveled faced lugs 73ᵃ on the pawls 73 and cause a positive oscillation of said pawls to throw their forward ends into engagement with notches 74 in the rods and hold the cutter-frame against making the forward return stroke with the pitman-rods 68. The movement communicated to the pawls 73 by the engagement of the rods 75 therewith imparts an outward releasing movement to the catch-rod 79, through the medium of the crank-lever 81, rod 83, crank-shaft 85 and drums 84, 86 and rod 87, as shown in Fig. 1, and permits the table 28 to be lowered by the weight of its filled mold-box. The raising of the valve-member 33 also causes a raising of the rod 95 due to the catch 97 carried by the rod 98 engaging and lifting the catch 96 carried at the upper end of the rod 95. At a predetermined point in the raising of the rod 98 the catch 97 is released from the catch 96 due to the cam-finger 101 permitting the catch 97 to move outward under the influence of its spring. As the rod 95 is raised it rocks the bell-crank lever 93 and causes a releasing movement of the attached catch-rod 90' from engagement with the notch 92' in the post 31' to permit the table 28' and its mold-box 27' to be elevated in position for the latter to be filled from the conduit 24' due to the action thereon of the toggles 88 and springs 89. As the table 28' reaches its limit of upward movement the associated catch-rod 79', actuated by the spring 80', moves under the lower end of the post 31' to maintain it and the table in elevated position and at the same time moves the connection between it and the pawls 73' in the proper direction to release them from engagement with the rods 75' of the cutter-frame 71', thus permitting the cutter-frame, actuated by the springs 77', to return to its normal forward or open position to uncover the discharge-openings 26' in the conduit 24'. The turning of the shaft 46 also imparts a single revolution to the shaft 114 through the medium of the sprocket-wheels 115 and 120 and chain 119, thus revolving the crank-disk 116 and closing the gate 25 by the action thereon of the guide-box 118 carried by the connecting-rod 117. As the gate 25 nears its limit of downward movement the contiguous end of the catch-rod 121' moves into a notch 123 in the arm 108, and releases the notch 124' in the opposite gate arm 108' to permit the gate 25' to ascend under the influence of the spring 112'. On the upward movement of the arm 108' the catch-rod 121 is forced out of engagement with the notch 123' against the tension of its spring and into engagement with the notch 124 in the arm 108, thus locking the arm and its gate 25 in lowered position. It will be understood that these same operations are then repeated with the other set of coöperating parts, thus causing the mold boxes on the tables 28, 28' to be alternately raised and filled and then lowered for the filled boxes to be removed therefrom and empty ones inserted in their places.

I wish it understood that I do not desire to be restricted to the exact details of construction and arrangement of parts shown and described, as obvious modifications will occur to persons skilled in the art.

Having thus described my invention, what I claim as new and desire to secure by Letters Patent, is:—

1. In a machine of the class described, the combination with two discharge conduits, of a mold-box carrying table vertically movable beneath the discharge outlet of each conduit, means acting on each table to normally retain it in elevated position, means for locking each table in elevated position, means for locking each table in lowered position, a valve associated with each conduit outlet, said valve being moved by the action of the substance being discharged when an associated mold-box becomes filled, and mechanism associated with each conduit and actuated by a movement of the valve to release the locking means of the associated table to permit a lowering thereof and to release the locking means of the other table to permit an elevation thereof, substantially as described.

2. The combination with two discharge conduits, of normally elevated mold-box carrying tables movably associated with the discharge of each conduit, said tables being alternately moved to fill and discharge their boxes, means acting to retain one table in elevated position, means acting to retain the other table in lowered position when the first is elevated, and mechanism automatically operated by the action of substance being discharged whereby as the box on the elevated table is filled the means holding the same in elevated position is moved to permit the table to lower under the weight of the substance and the means holding the other table in lowered position is moved to permit such table to rise in position to be filled.

3. The combination with two discharge conduits, of two receptacle-carrying tables associated therewith and adapted to have alternate movements to raise one in filling position when the other is lowered, means acting on each table to normally maintain it elevated, and mechanism automatically operated by the direct action thereon of the substance being discharged when a receptacle is filled to control the changing movements of the tables.

4. The combination with two discharge conduits, of a mold-supporting member associated with each conduit, one member being intended to be in filling position when the other is in discharging position, separate means for acting on each member to retain it in elevated position, separate means for acting on each member to retain it in lowered position, a valve associated with each conduit, mechanism operated by a movement of the valve occasioned by the action of the discharging-matter thereon when a mold becomes filled to move the means holding the elevated member in such position to permit a lowering thereof and to move the means holding the other member in lowered position to permit an elevating thereof, and means acting on each member to yieldingly raise it to filling position.

5. The combination with two discharge conduits, of a tray-carrying member associated with the discharge of each conduit and normally held elevated in filling position, two catch-rods coöperating with each member, one to retain it in elevated and the other in lowered position, and mechanism controlled by the action of the substance being discharged when a tray has been filled for effecting a release of the catch-rod supporting the elevated member to permit it to lower under the weight of its load and a release of the catch-rod retaining the other member in lowered position to permit it to rise to filling position.

6. The combination with two discharge conduits, of a mold-carrying member associated with the discharge of each conduit and normally held elevated in filling position, two catch-rods coöperating with each member, one to lock it in elevated and the other in lowered position, an element associated with each conduit and movable by the action thereon of the substance being discharged when the elevated mold is filled, mechanism operated by the movement of the element to release the catch-rod locking the member in elevated position to permit it to lower under the weight of its load, and mechanism operated by the movement of the valve to release the catch-rod which locks the other member in lowered position.

7. The combination with two discharge conduits, of a mold-carrying member movably associated with the discharge of each member, spring actuated toggle means normally acting to elevate the members, two locking means coöperating with each member, one means to lock it in elevated and the other in lowered position, and mechanism operated by the action of the substance being discharged when a mold is filled for releasing the locking means which retains one member in elevated position and the locking means which retains the other member in lowered position, substantially as described.

8. The combination with two discharge conduits, of a vertically movable mold-carrying member associated with the outlet of each conduit, means acting on each member to elevate it when its mold is empty, two locking means associated with each member, one means to lock it in elevated and the other to lock it in lowered position, and mechanism actuated by the action of the substance being discharged when a mold is filled for releasing the locking means which retains one member in elevated position and the locking means which retains the other member in lowered position, substantially as described.

9. The combination with two discharge conduits, of a mold-carrying member associated with each conduit and movable to filling and emptying positions, relative to its conduit, means acting on each of said members to normally maintain it elevated, means coöperating with each member when in emptying position to hold it in such position, and mechanism operated by the action thereon of the substance being discharged from one conduit to release the means retaining the member associated with the other conduit to permit said member to move to filling position.

10. The combination with two discharge conduits, of a normally elevated mold-carrying member associated with each conduit and movable relative to its conduit to be filled and emptied, a valve associated with each conduit and movable by the action of the substance being discharged when an associated mold is filled, means acting on each member when in emptying position to hold it in such position, and mechanism actuated by the movement of the valve of one conduit to effect a release of the means holding the member associated with the other conduit to permit such member to move to filling position.

11. The combination with a plurality of discharge conduits, of a mold-carrying member associated with each conduit, means operating to normally retain each member in elevated or filling position, a catch-element coöperating with each member when lowered to retain it in such position, and mechanism associated with each conduit and movable to effect a release of the catch-element of the member associated with one of the other conduits whereby such member may move to elevated position, the movement of the mechanism being controlled by the action of the substance discharged from the associated conduit.

12. The combination with a plurality of discharge conduits, of a vertically movable mold-carrying member associated with each conduit, means acting to raise each member to elevated or filling position, a catch-mechanism coacting with each member when in lowered position to retain it in such position, a valve in each conduit having its movement controlled by the action of the substance being discharged, and a trip member carried by each valve and movable by a movement of the valve to engage and impart a releasing movement to the catch-mechanism of one of the other conduits whereby to permit a raising of the member of such conduit, substantially as described.

13. The combination with a discharge conduit, of a mold-carrying member movable relative to the discharge outlet of the conduit, means acting on the member to normally retain it in elevated or filling position, and mechanism having a part normally coacting with the member when elevated to retain it in such position and a part operated on by the action of the substance discharged whereby to automatically release the member when its mold is filled to permit the member to be lowered under the weight of its load, substantially as described.

14. The combination with a discharge conduit, of a vertically movable mold-carrying member yieldingly supported in filling position when its mold is empty, a catch-element coacting therewith to lock it in elevated position, and mechanism automatically operated by the direct action thereon of the substance being discharged to release the catch-element to permit a lowering of the member under its load when it is filled.

15. The combination with a discharge conduit, of a vertically movable mold-carrying member, means yieldingly acting thereon to normally retain it elevated in filling position when its mold is not filled, a valve in the conduit movable by the action thereon of the discharging matter when a mold is filled, and mechanism having a part normally elevated to retain it in such position and movable by the valve when moved to effect a release of the member to permit it to lower under the weight of the filled mold.

16. The combination with a discharge conduit, of a vertically movable mold-carrying part, toggle means yieldingly acting on the part to retain it elevated in filling position when its mold is empty, a member in the conduit movable by the action thereon of the discharging matter when a mold becomes filled, a catch normally coacting with the part when elevated to retain it in such position, and mechanism operated by a movement of said member to effect a release of the catch to permit the part to lower under its load, substantially as described.

17. The combination with a discharge conduit, of a vertically movable mold-carrying member yieldingly supported in filling position, and mechanism having a part normally acting to engage said member when elevated to retain it in such position and automatically operated at a predetermined stage in the mold-filling operation by the action of the discharging matter to effect a release of such part to permit the member to lower under the weight of its load, substantially as described.

18. The combination with a discharge conduit, of a vertically movable mold-carrying member yieldingly supported in filling position when its mold is empty, means normally acting on the member when elevated to retain it in such position, and mechanism automatically movable by the action thereon of the discharging matter when a mold becomes filled to close the conduit outlet and move said means to permit the member to lower under the weight of its load.

19. The combination with a discharge conduit, of a movable mold-carrying member yieldingly supported in filling position relative to the conduit, an element in the conduit movable by the action of the discharging matter when a mold becomes filled, means normally acting on the member when in filling position to retain it in such position, and mechanism movable by said element to close the conduit outlet and move said means to permit the member to lower under the weight of its load.

20. The combination with a discharge conduit, of a vertically movable mold-carrying member, toggle means yieldingly supporting said member in filling position, means normally operating on the member when in filling position to retain it in such position and mechanism movable by the action thereon of the discharging matter when a mold becomes filled to close the conduit outlet and move said means to release the member to permit it to lower under the weight of its load.

21. The combination with a discharge conduit, of a vertically movable mold-carrying member yieldingly supported in filling position when its mold is empty, means normally acting on the member when elevated to retain it in such position, a part movable to close the conduit outlet and release said means to permit the member to lower under the weight of its load, and mechanism movable by the action thereon of the discharging-matter when a mold becomes filled to effect a closing movement of said part.

22. The combination with a discharge conduit, of a vertically movable mold-carrying member yieldingly supported in filling position when its mold is empty, means normally coacting with the member when elevated to retain it in such position, a part movable to close the conduit outlet and effect a releasing movement of said means to permit the member to lower under the weight of its load, an element in the conduit movable by the action thereon of the discharging matter when a mold becomes filled, and mechanism operated by the movement of said element to effect a closing movement of said part.

23. The combination with a discharge conduit of a vertically movable mold-carrying member, toggle means operating to yieldingly support the member in filling position when its mold is empty, means normally acting on the member when in filling position to retain it in such position, a cutter-member movable to close the discharge outlet of the conduit and sever the discharging column, said cutter-member being adapted when at its limit of closing movement to effect a releasing movement of the member-supporting means to permit the member to lower under the weight of its load, and mechanism automatically operated by the action of the discharging matter when a mold becomes filled to effect a closing movement of the cutter-member, substantially as described.

24. The combination with two discharge conduits, of a vertically movable mold-carrying member associated with each conduit and yieldingly retained in filling position relative thereto, one member being intended to be in filling position when the other is in discharging position, separate means for acting on each member to retain it in elevated position, separate means for acting on each member to retain it in lowered position, a cutter-member associated with each conduit and movable to close the outlet thereof and to effect a release of the member-supporting means to permit such member to lower under the weight of its load, and mechanism automatically operated by the action of the discharging matter when a mold becomes filled to effect a closing movement of the cutting-member associated with the member carrying the mold being filled and to effect a release of the means retaining the other member in lowered position to permit it to move to filling position relative to its conduit.

25. The combination with two discharge conduits, of a mold-carrying member associated with each conduit and normally held elevated in filling position, an element normally acting on each member when in filling position to retain it in such position, an element normally acting on each member when in emptying position to retain it in such position, a cutter-member associated with each conduit being movable to close the discharge outlets thereof and to effect a release of the associated member-supporting element to permit the member to lower under the weight of its load, a part associated with each conduit and movable by the action thereon of the discharging matter when an associated mold becomes filled whereby to effect a closing movement of the cutter-member and to release the element which holds the other member in emptying position to permit it to move to filling position relative to its conduit.

26. The combination with two discharging conduits, of a vertically movable mold-carrying member associated with each conduit, means acting on each member to normally retain it elevated in filling position relative to its conduit, two catch-means coöperating with each member, one to retain it in elevated and the other in lowered position, a cutter-member associated with each conduit and movable to close the discharge outlet thereof and to effect a release of the catch-means supporting the associated member to permit said member to lower under the weight of its load, and mechanism associated with each conduit and operated by the action thereon of the discharging matter when an associated mold is filled to move the cutter-member to close the discharge outlet and to release the catch-means holding the member associated with the other conduit in lowered position, whereby to permit said member to move to filling position relative to its conduit, the catch-means which acts to support said member when elevated operating to release the associated cutter-member to open the conduit when said catch-means moves into locked position.

27. The combination with two discharge conduits, of a vertically movable mold-carrying member associated with each conduit, toggle means for retaining each member in elevated position, catch-means normally acting on each member when elevated to retain it in such position, catch-means normally acting on each member when lowered to retain it in such position, a normally open outlet-closing part associated with each conduit, said part when closed being adapted to move the catch member supporting the associated mold-carrying member to permit said member to lower under the weight of its load, said closing part being held in closed position when the mold-carrying member is in lowered position and released to permit it to open when the supporting catch-means of the associated mold-carrying member moves into locking position therewith, and mechanism operated by the action of the discharging matter when an associated mold becomes filled to move the closing-part to close the discharge outlet and to effect a release of the catch-means which holds the other mold-carrying member in lowered position to permit it to move to filling position.

28. The combination with a discharge conduit, of a vertically movable mold-carrying member yieldingly held in elevated position, means normally acting on the member when elevated to retain it in such position, a normally open outlet-closing part adapted when moved to close the conduit outlet to effect a release of said means from said member to permit it to lower under the weight of its load, said part being held by said means in closed position when the member is lowered and adapted to be released to permit it to open when said means moves into supporting engagement with the member when elevated, and mechanism operated by the action thereon of the discharging matter when the mold becomes filled to move said part to close the conduit outlet.

29. The combination with a discharge conduit, of a vertically movable member yieldingly supported in filling position, a catch-element normally coacting with the member to hold it in elevated position, a revolving member, clutch-mechanism adapted to be thrown into engagement with the revolving member and to effect a release of the catch-element to permit the member to lower under the weight of its load, and mechanism operated by the action of the discharging matter when a mold becomes filled to effect an engagement of the clutch-mechanism.

30. The combination with a discharge conduit, of a vertically movable mold-carrying member yieldingly supported in elevated position, catch-mechanism normally acting on the member when elevated to retain it in such position, a shaft, drive means loose on said shaft, clutch-mechanism adapted to be thrown into engagement with the drive means to effect a revolution of the shaft, means actuated by the movement of the shaft to effect a release of the clutch-mechanism to permit the member to lower under the weight of its load, and mechanism actuated by the action of the discharging matter at a predetermined stage in the discharging operation to effect an engagement of the clutch, said clutch being adapted to be automatically thrown out of engagement at a predetermined point in the rotation of the shaft.

31. The combination with a discharge conduit, of a vertically movable mold-carrying member yieldingly supported in filling position, catch-means normally acting on the member when in filling position to maintain it in such position, an element movable to close the outlet of the conduit during such closing movement to effect a release of said catch-means to permit the member to lower under the weight of its load, a shaft, a driven element loosely carried by said shaft, clutch-means adapted to be thrown into engagement with the driven element to effect a rotation of the shaft, mechanism adapted to communicate a closing movement to the outlet-closing element when the shaft is rotated, and mechanism operated by the action of the discharging matter when a mold becomes filled to effect an engagement of the clutch, said clutch being adapted to be thrown out of engagement at a predetermined point in the revolution of the shaft.

32. The combination with a discharge conduit, of a vertically movable mold-carrying member yieldingly supported in filling position, catch means normally acting on the member when elevated to retain it in such position, an element movable to close the discharge outlet and when in closed position to be engaged by the catch-means to retain it in such position and to effect a release of the catch-means from the member to permit it to lower under the weight of its load, said catch-means being adapted to release the closing element when the mold-carrying member returns to its normal elevated position, a shaft, a driven member loose on the shaft, clutch-mechanism adapted to be thrown into engagement with the driven member to rotate the shaft, means for communicating a closing movement to the outlet-closing element when the shaft is rotated, a pawl coacting with the clutch-mechanism to normally retain it disengaged and mechanism operative by the action of the discharging matter when a mold becomes filled to effect a movement of the pawl to release the clutch-mechanism, said pawl being adapted to again engage the clutch-mechanism to throw it out of engagement when the shaft has completed a single revolution.

33. The combination with two discharge conduits, of a vertically movable mold-carrying member associated with each conduit and normally retained in elevated position, catch-means normally acting on each member when in elevated position to retain it in such position, catch-means normally acting on each member when in lowered position to retain it in such position, a shaft, a driven member loosely mounted on the shaft, mechanism movable by a rotation of the shaft to effect a release of the member-supporting means to permit the supported member to lower under the weight of its load, and mechanism movable by the action of the discharging matter when an elevated mold becomes filled, to effect an engagement of the clutch-means to rotate the shaft and a movement of the means retaining the member associated with the other conduit in lowered position to permit such member to move to elevated filling position.

34. The combination with two discharge conduits, of a vertically movable mold-carrying member associated with each conduit and yieldingly supported in elevated or filling position, means normally acting on each member when elevated to retain it in such position, means normally acting on each member when lowered to retain it in such position, an element associated with each conduit and movable to close the outlet thereof, and when in closed position to effect a movement of the means supporting the associated member to permit such member to lower under the weight of its load, a shaft, a driven member carried by said shaft, clutch-means movable to engage the driven member and communicate rotation to the shaft, a pawl normally acting on the clutch-means to retain it in disengaged position, mechanism movable by a rotation of the shaft to effect a closing of the outlet closing element, and mechanism associated with each conduit and movable by the action of the discharging matter when an associated mold-box becomes filled to effect a release of the pawl from the clutch-means to permit a rotation of the shaft and to impart a releasing movement to the means holding the member associated with the other conduit in lowered position to permit such member to move to filling position.

35. The combination with two discharge conduits, of a movable mold-carrying member associated with each discharge conduit, a gate associated with each conduit, and mechanism associated with each conduit and operated by the action thereon of the discharging matter when an associated mold becomes filled to effect a closing of its gate and an opening of the gate associated with the other conduit.

36. The combination with a plurality of discharge conduits, of a movable mold-carrying member associated with each conduit, a gate associated with each conduit for closing the same, mechanism for effecting alternate movements of the gates so that one conduit will be open when the other is closed, and mechanism associated with each conduit and operated by the action thereon of the discharging matter when an associated mold becomes filled to effect a movement of said first mentioned mechanism to close the associated gate and open the other gate.

37. The combination with two discharge conduits, of a movable mold-carrying member associated with each conduit, a gate for closing each conduit, revoluble means associated with each gate and having connection therewith to effect a closing of the gate when open, means normally locking one gate in lowered position when the other is elevated, and operated to effect a release of the lowered gate to permit it to rise when the elevated gate is lowered, and mechanism associated with each conduit and movable by the action of the discharging matter when a mold becomes filled to impart movement to the associated revoluble means whereby to close the associated gate and effect an opening of the other gate.

38. The combination with two discharge conduits, of a mold-carrying member associated with each conduit, a gate associated with each conduit and normally retained in elevated position, common means acting on each gate to lock one in closed position when the other is open and adapted to be released from the closed gate to permit it to open when the other gate is closed, a revoluble crank-member associated with each gate, connection between the crank-member and gate to effect a closing of the gate when the crank-member is revolved, an element mounted in each conduit and movable by the action of the discharging matter when a mold becomes filled, and mechanism associated with each conduit and operated by a movement of said element to effect a revolution of the associated crank-member whereby to close the associated gate and open a gate of the other conduit.

39. The combination with two discharge conduits, of a mold-carrying member movably associated with each conduit, a gate associated with each conduit, means normally acting on each gate to retain it in yielding elevated position, a pair of catch-rods having spring-actuated movements in opposite directions and adapted to lock one gate in open position when the other is closed and to release the closed gate to permit it to open when the other gate is moved to closed position, a shaft associated with each conduit, a driven member loosely mounted on each shaft, clutch-means adapted to be moved into engagement with said driven member, an element normally holding the clutch-means in disengaged position, mechanism associated with each conduit and movable by the action of the matter discharged therefrom when a mold becomes filled to effect a release of the associated element to permit an engagement of the clutch means to rotate the shaft, and mechanism adapted to communicate a closing movement to each gate from the shaft associated with its conduit when such shaft is rotated.

40. The combination with two discharge conduits, of a mold-carrying member movably associated with each conduit, a gate associated with each conduit and normally held in open position, common means acting on the gates to retain one in closed position when the other is open and to release the closed gate to permit an opening movement thereof when the other gate is moved to closed position, a shaft associated with each conduit, a driven member loosely carried by said shaft, clutch-means feathered to the shaft for engagement with the driven member, a pawl normally acting on the clutch-means to retain it in disengaged position, an element associated with each conduit and movable by the action of the matter discharged therefrom when an associated mold becomes filled, trip-means movable by said element to effect a release of the pawl from the clutch-means to permit an engagement of the latter, said pawl being adapted to again engage the clutch-means to disengage it at the completion of a revolution of the shaft, a crank-member associated with each conduit and having connection with its gate to effect a closing movement of the gate when the crank-member is revolved, and means for communicating a single revolution to each crank-member when the shaft associated with its conduit is rotated, substantially as described.

41. The combination with a discharge conduit, of a mold-carrying member movable to filling and emptying positions relative to the conduit, and mechanism for holding the member in filling position which is automatically released at a predetermined stage in the mold-filling operation by the action on a part of said mechanism of the discharging matter.

42. The combination with a discharge conduit, of a mold-carrying member movable to filling and emptying positions, means for holding the member in filling position, and mechanism automatically movable by the direct action thereon of the discharging matter to release said means from the member at a predetermined stage in the mold-filling operation.

43. The combination with a discharge conduit, of a mold-carrying member movable to filling and emptying positions, means for holding the member in filling position, and mechanism automatically movable by the direct action thereon of the discharging matter at a predetermined stage in the mold-filling operation to close the conduit outlet and move said means to release the member.

44. The combination with a discharge conduit, and a member associated therewith to be filled, of mechanism having a part with which the discharging matter has contact prior to its discharge into said member, said mechanism being movable by the action of the discharging matter on said part to close the conduit outlet when the member has been filled to a predetermined stage.

45. The combination with a discharge-conduit, and a member associated therewith to be filled, of an element slidable across the conduit outlet to open and close the same, and mechanism having a part exposed to the action of the discharging matter prior to its contact with said member, said mechanism being movable by the action of the discharging matter on said part to effect a movement of said element to close the conduit outlet at a predetermined stage in the filling operation.

46. The combination with two discharge conduits, of a mold-carrying member associated with each conduit and movable to filling and emptying positions, means for holding one member in emptying position during the filling of the other member, and mechanism movable by the direct action thereon of the discharging matter at a predetermined stage in the filling of one member whereby to release the means holding the other member in emptying position.

47. The combination with two discharge conduits, a shut-off gate in each, and a mold associated with each conduit for receiving the discharged matter, of mechanism having a part subjected to the direct action of the discharging matter, before leaving the conduit and movable by such action at a predetermined stage in the filling of a member to automatically operate the mechanism to effect an opening of one and a closing of the other gate.

In testimony whereof I have hereunto signed my name to this specification in the presence of two subscribing witnesses.

GEORGE MATTHEWS.

Witnesses:
   C. W. OWEN,
   HAZEL B. HIETT.